(12) United States Patent
Lee et al.

(10) Patent No.: US 9,467,074 B2
(45) Date of Patent: Oct. 11, 2016

(54) PIEZOELECTRIC GENERATOR FOR SUPPLYING POWER TO PORTABLE TERMINAL

(71) Applicant: KOREA ELECTRONICS TECHNOLOGY INSTITUTE, Seongnam-si, Gyeonggi-do (KR)

(72) Inventors: Hyeung Gyu Lee, Seoul (KR); Chan Sei Yoo, Uiwang-si (KR); Hyung Won Kang, Seoul (KR); Seung Ho Han, Yongin-si (KR)

(73) Assignee: KOREA ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 28 days.

(21) Appl. No.: 14/413,975

(22) PCT Filed: May 13, 2013

(86) PCT No.: PCT/KR2013/004203
§ 371 (c)(1),
(2) Date: Jan. 9, 2015

(87) PCT Pub. No.: WO2014/010821
PCT Pub. Date: Jan. 16, 2014

(65) Prior Publication Data
US 2015/0207436 A1    Jul. 23, 2015

(30) Foreign Application Priority Data

Jul. 11, 2012 (KR) .................. 10-2012-0075569

(51) Int. Cl.
*H02N 2/18* (2006.01)
*H02J 7/32* (2006.01)

(52) U.S. Cl.
CPC ............ *H02N 2/186* (2013.01); *H02J 7/32* (2013.01); *H02N 2/18* (2013.01); *Y02B 40/90* (2013.01)

(58) Field of Classification Search
CPC ....... H01L 41/113; H02N 2/18; H02N 2/186
USPC ........................................... 310/339
See application file for complete search history.

(56) References Cited

U.S. PATENT DOCUMENTS

2009/0322184 A1\* 12/2009 Carman ............... H02N 2/186
                                                        310/339
2010/0277126 A1\* 11/2010 Naeimi ............... H02K 7/1853
                                                        320/137

(Continued)

FOREIGN PATENT DOCUMENTS

JP    2006-294947 A    10/2006
JP    2008-192944 A    8/2008

(Continued)

OTHER PUBLICATIONS

Korean Office Action for application No. 10-2012-0075569 dated Nov. 6, 2013.

(Continued)

*Primary Examiner* — J. San Martin
(74) *Attorney, Agent, or Firm* — Hauptman Ham, LLP (57) ABSTRACT

A piezoelectric generator for power supply of a portable terminal is provided. The piezoelectric generator includes: a portable terminal case which has a battery mounting part formed on one surface thereof and has parts of the portable terminal mounted therein; a slide part which is formed on opposite side surfaces of a border of the portable terminal case to be able to slide up and down; and a piezoelectric body which has one end or opposite ends connected with the slide part and is disposed in the battery mounting part in a transverse direction, and which vibrates by a sliding movement of the slide part.

13 Claims, 6 Drawing Sheets

(56) References Cited

U.S. PATENT DOCUMENTS

2011/0012459 A1  1/2011  Chang et al.
2012/0161583 A1* 6/2012  Kang .................... H01L 41/113
                                                           310/339

FOREIGN PATENT DOCUMENTS

| | | |
|---|---|---|
| JP | 2009-106104 A | 5/2009 |
| KR | 10-2009-0048974 A | 5/2009 |
| KR | 10-2010-0092806 A | 8/2010 |
| KR | 10-1125164 B1 | 3/2012 |
| KR | 10-2012-0071767 A | 7/2012 |

OTHER PUBLICATIONS

International Search Report for PCT/KR2013/004203 dated Jul. 26, 2013.

Extended European Search Report for corresponding European Patent Application No. 13816686.3 issued on Mar. 3, 2016.

\* cited by examiner

FIG. 6

PIEZOELECTRIC GENERATOR FOR SUPPLYING POWER TO PORTABLE TERMINAL

CROSS-REFERENCE TO RELATED APPLICATION

This application is a National Stage of International Application No. PCT/KR2013/004203, filed on May 13, 2013, and claims priority from Korean Patent Application No. 10-2012-0075569 filed on Jul. 11, 2012, the disclosure of which is incorporated herein in its entirety by reference.

TECHNICAL FIELD

Methods and apparatuses consistent with exemplary embodiments relate to a piezoelectric generator, and more particularly, to a piezoelectric generator which can regularly supply power to a portable terminal such as a mobile phone, an MP3 player, a digital camera, and the like.

BACKGROUND

Today, portable terminals such as mobile phones (particularly, smartphones), MP3 players, digital cameras, tablet PCs and the like are an inextricable part of real life. In particular, the proportion of smartphones and tablet PCs actively used worldwide is remarkably increasing and thus the demand for a power charging device for regularly supplying power to the portable terminal is rapidly increasing.

Users generally charge their portable terminals at their bedtime. However, since recent portable terminals are widely used for users' life style and are equipped with various functions (in particular, accessing the Internet) that have never existed before, power consumption of the battery greatly increases compared to the past. Therefore, the battery of the portable terminal may discharge anytime even in an emergency case and this situation may embarrass users who desperately need portable terminals in real life. Therefore, there is an increasing demand for a device which can regularly supply power to the portable terminal.

One of the alternatives for supplying power to the portable terminal is a piezoelectric generator. The piezoelectric generator is a power generator using a piezoelectric material which causes a piezoelectric phenomenon in which polarization (electric energy) is induced in material when mechanical energy (wind, vibration, or the like) is externally applied.

Most of the modern piezoelectric generators are generally designed to generate power by transmitting vibration energy to one end of a piezoelectric material using a configuration of cantilever or bimorph (or unimorph) and having the shape of the piezoelectric material changed (crooked or bent). The most effective and essential factor in the method for transmitting vibration energy to a piezoelectric is combining a mass of appropriate weight with one end of the piezoelectric material.

However, applying such a piezoelectric generator to portable terminals goes against the current consumer trends for the portable terminals. This is because the mass included in the piezoelectric generator increases weight and volume of the portable terminal.

The current consumer trends for the portable terminals focus on smaller, lighter, and slimmer devices. Therefore, research on a piezoelectric generator which can regularly supply power to a portable terminal without increasing weight and volume of the portable terminal is being conducted.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a piezoelectric generator which can be integrated into a portable terminal and used for power supply without increasing volume or weight of the portable terminal.

According to an aspect of an exemplary embodiment, there is provided a piezoelectric generator for power supply of a portable terminal, including: a portable terminal case which has a battery mounting part formed on one surface thereof and has parts of the portable terminal mounted therein; a slide part which is formed on both side surfaces of a border of the portable terminal case to be able to slide up and down; and a piezoelectric body which has one end or both ends connected with the slide part and is disposed in the battery mounting part in a transverse direction, and which vibrates by a sliding movement of the slide part.

According to another aspect of an exemplary embodiment, there is provided a piezoelectric generator for power supply of a portable terminal, including: a portable terminal case which has a battery mounting part formed on one surface thereof and has parts of the portable terminal mounted therein; a slide part which is formed on at least one side surface of the portable terminal case to be able to slide up and down, and which is connected with at least some of the parts of the portable terminal; and a piezoelectric body which is disposed in the battery mounting part in a transverse direction.

The piezoelectric generator may further include a first connection part which connects the piezoelectric body and an upper surface of the battery mounting part or at least some of the inner parts of the portable terminal, and which transmits a weight of the portable terminal or a weight of the inner parts of the portable terminal to the piezoelectric body.

The piezoelectric generator may further include a second connection part which connects the piezoelectric body and a bottom surface of the battery mounting part.

The first connection part and the second connection part may be elastic plates, elastic wires, or coil springs.

The piezoelectric generator may further include an electrode which is formed on at least one surface of the piezoelectric body.

The slide part may be formed to protrude from an outer surface of the portable terminal case by a predetermined distance.

The slide part may have an accessory connection part formed on at least part thereof to allow an accessory such as a strap or a key ring to be connected therewith.

According to the above-described exemplary embodiments, the slide part is formed on the portable terminal case and the piezoelectric body or at least part of the parts of the portable terminal vibrates by the movement of the slide part. Therefore, power can be supplied to the portable terminal with a relatively simple configuration and can be usefully used in an emergency case.

In addition, the weight of the portable terminal or at least some of the parts of the portable terminal may be used to vibrate the piezoelectric body, so that power can be generated without increasing the weight and volume of the portable terminal.

BRIEF DESCRIPTION OF THE DRAWINGS

The above and/or other aspects of the invention will become and more readily appreciated from the following description of the exemplary embodiments, taken in conjunction with the accompanying drawings of which.

DETAILED DESCRIPTION OF EXEMPLARY EMBODIMENTS OF THE INVENTION

Reference will now be made in detail to the present exemplary embodiments of the present disclosure, examples of which are illustrated in the accompanying drawings, wherein like reference numerals refer to the like elements throughout. The exemplary embodiments are described below in order to explain the present disclosure by referring to the figures.

(1) First Exemplary Embodiment

Figure 1:
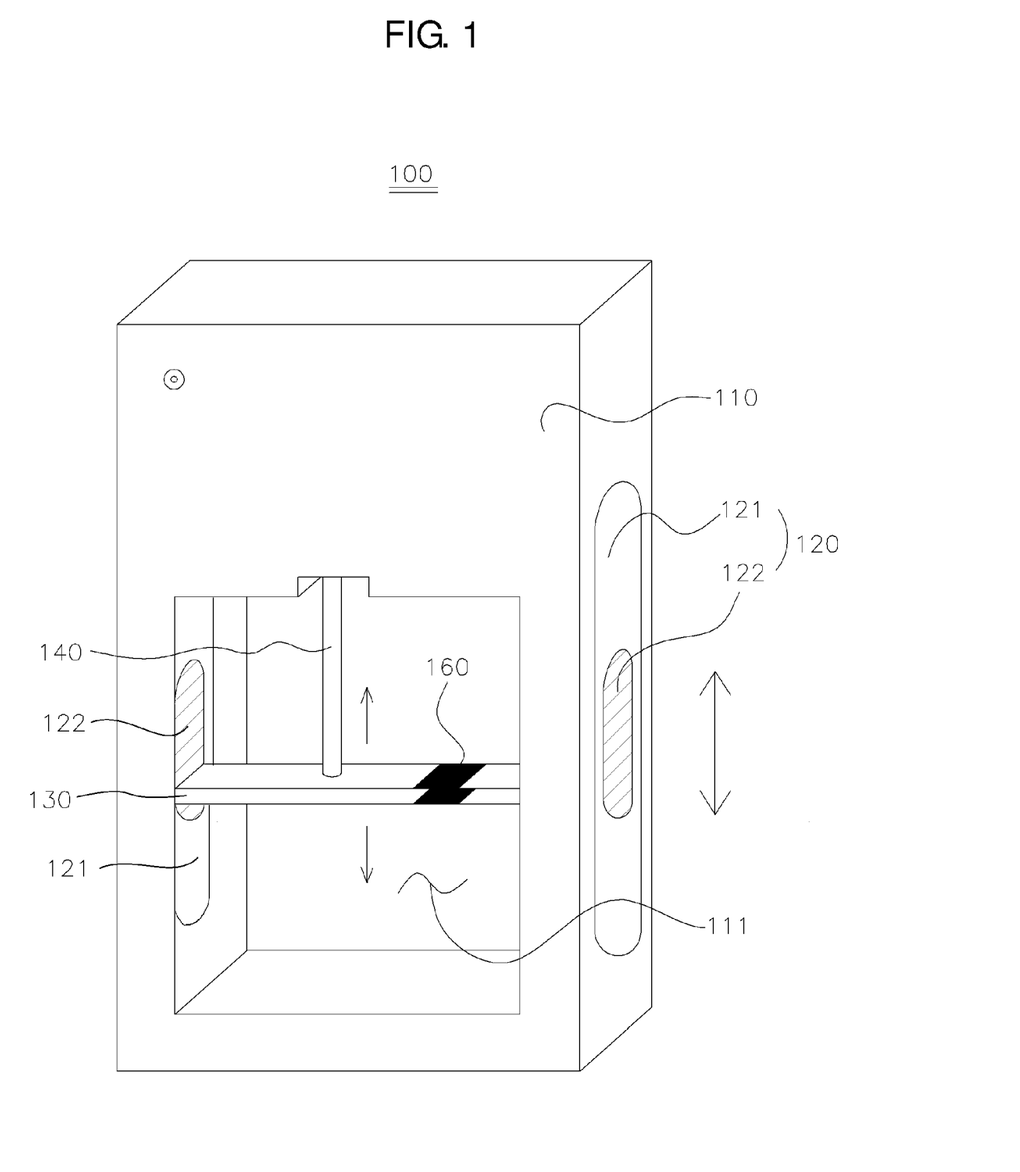
FIG. 1 is a view schematically showing a piezoelectric generator for power supply of a portable terminal according to a first exemplary embodiment of the present disclosure.
Figure 2:
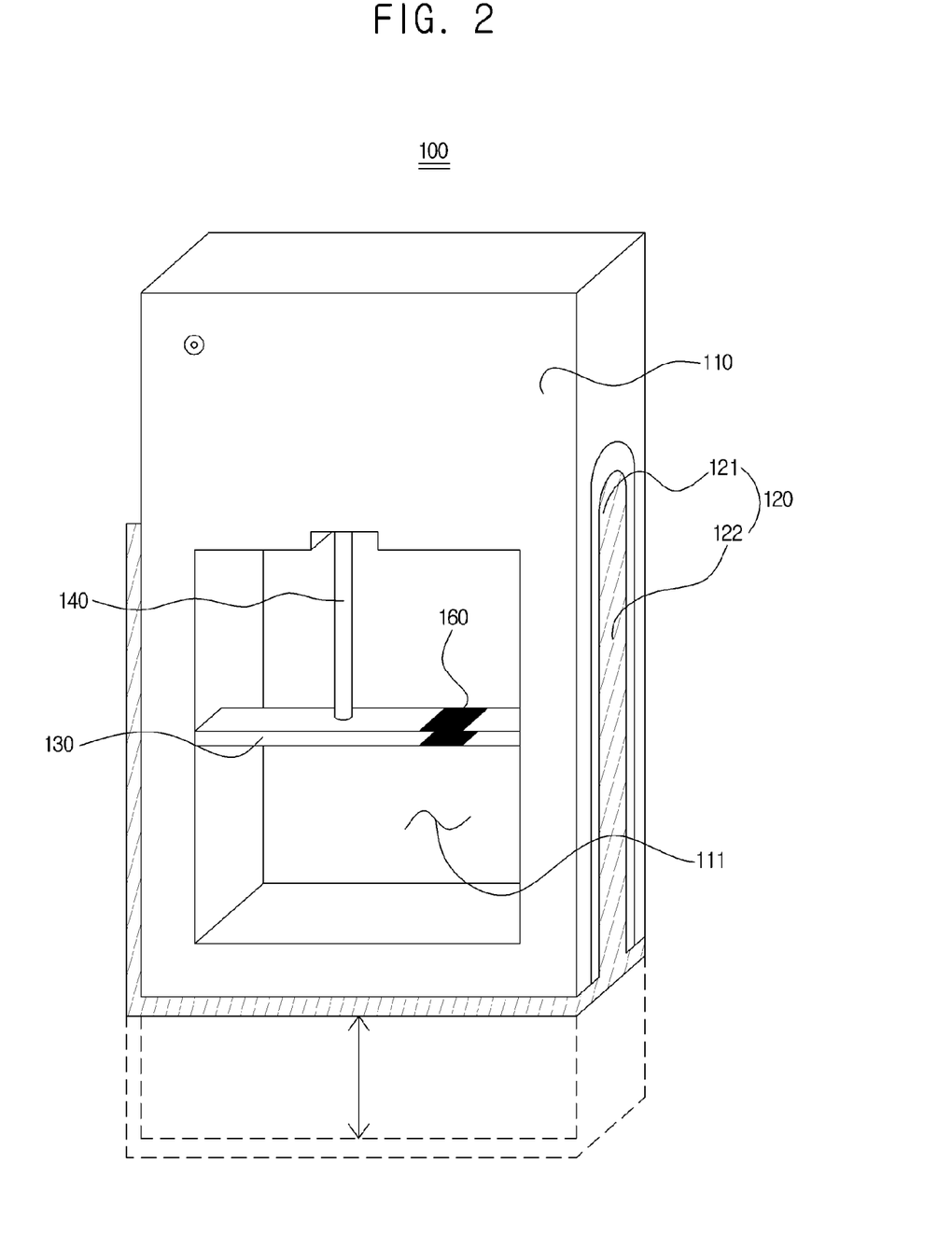
FIG. 2 is a view showing another example of a slide part of FIG. 1.

FIG. 1 is a view schematically showing a piezoelectric generator 100 for power supply of a portable terminal (hereinafter, referred to as a piezoelectric generator) according to a first exemplary embodiment of the present disclosure, and FIG. 2 is a view schematically showing another example of a slide part 120 of FIG. 1.

The term "portable terminal" used in this description means mobile devices such as mobile phones, smartphones, players, digital cameras, tablet PCs, and the like, but is not limited to the above-mentioned devices.

Referring to FIGS. 1 and 2, the piezoelectric generator 100 is disposed in a portable terminal and includes a portable terminal case 110, a slide part 120, and a piezoelectric body 130.

The portable terminal case 110 corresponds to a housing of a typical portable terminal such as a smartphone and is not limited to a specific kind of case. The portable terminal case 110 has a battery mounting part 111 formed on one surface thereof (In general, the battery mounting part 111 is formed on a rear surface of the portable terminal case).

The battery mounting part 111 may be where a battery is mounted and may be formed by making a space of a predetermined size on the rear surface of the portable terminal case 110 to be able to accommodate a battery therein. The shape and size of the battery mounting part 111 are not limited.

Various parts for driving the portable terminal may be mounted in the portable terminal case 110. In this description, the portable terminal parts mounted in the portable terminal case 110 are called "inner parts" of the portable terminal. The inner parts are disposed inside the portable terminal case 110 and thus are not seen from the outside.

The slide part 120 is disposed on both side surfaces of the border of the portable terminal case 110. Accordingly, when a user holds the slide part 120 with user's one hand (the user may hold one slide part with user's thumb and hold the other slide part with the other fingers) and shakes the slide part 120 up and down, the portable terminal case 110 moves up and down. Although the slide part 120 is illustrated as being disposed on the right side surface of the border of the portable terminal case 110 in FIG. 1, the same slide part 120 may be disposed on the left side surface of the border of the portable terminal case 110.

For example, the slide part 120 may have a slide recess 121 of a predetermined size formed on the border of the portable terminal case 110, and have a longitudinal slide bar 122 inserted into the slide recess 121 to be able to slide up and down along the slide recess 121. Alternatively, only the slide bar 122 may be slidably formed without the slide recess 121.

The shape and size of the slide recess 121 and the slide bar 122 are not limited and any shape and any size can be applied if the slide bar 122 can slidably be formed on the both side surfaces of the border of the portable terminal case 110.

The slide part 120 may have an outer surface protruding therefrom. For example, the slide bar 122 of the slide part 120 may be outwardly curved such that the slide part 120 protrudes from the outer surface of the portable terminal case 110 to a predetermined distance. In this case, since the slide part 120 can be moved by external force in user's daily life (since the slide part 120 protrudes, the slide part 120 is highly likely to be moved by an external shock), power of a predetermined level can be regularly generated without the user's intentionally moving the slide part 120.

Referring to FIG. 2, the slide part 120 may be integrally formed with both side surfaces and a bottom surface of the border of the portable terminal case 110. Specifically, the slide recess 121 may be formed on the opposite side surfaces of the border of the portable terminal case 110 in a lengthwise direction, and the slide bar 122 may be formed in the shape of "U" along the right side surface, the bottom surface, and the left side surface of the border of the portable terminal case 110 and inserted into the slide recess 121 to be able to slide therein.

In this case, when the user shakes the portable terminal up and down after holding the slide bar 122 of the slide part 120 formed on the both side surfaces of the portable terminal case 110 with user's fingers, the lower portion of the slide bar 122 moves apart from or moves near to the lower surface of the portable terminal case 110 with a predetermined gap from the lower surface of the portable terminal case 110 and thus the piezoelectric body 130 connected with the slide bar 122 vibrates up and down.

The piezoelectric body 130 is connected with the slide part 120 and disposed in the battery mounting part 111 in a transverse direction. The piezoelectric body 130 is not limited to a specific kind of material if it can cause a piezoelectric phenomenon. For example, PZT (Pb(Ti, Zr)O$_3$), Ba$_2$TiO$_4$, or BaTiO$_3$ may be used.

The piezoelectric body 130 may be formed in a thin film shape, but is not limited thereto. When the piezoelectric body 130 is formed in a thin film shape, the piezoelectric body 130 has advantage of easily vibrating by small force. An elastic body (not shown) may be bonded to at least one surface of the piezoelectric body 130. Since the elastic member has its shape changed by external force and returns to its original shape when the external force is removed, the elastic member may facilitate vibration of the piezoelectric body 130.

The piezoelectric body 130 has one end or both ends connected with the slide part 120 such that the piezoelectric body 130 is placed in the transverse direction. When one end of the piezoelectric body 130 is connected with the slide part 120, the other end of the piezoelectric body 130 may be fixed to a side portion of the battery mounting part 111. That is, the piezoelectric body 130 may have the both ends fixed to the slide part 120 or the battery mounting part 111. Regarding this, FIGS. 1 and 2 illustrate the piezoelectric body 130 having the both ends connected with the slide part 120. However, one end of the piezoelectric body 130 may be connected with the slide part 120 and the other end may be fixed to the side portion of the battery mounting part 111.

Since the piezoelectric body 130 is connected with the slide part 120, the piezoelectric body 130 moves along with the slide part 120 and vibrates when the slide part 120 slides. Specifically, when the slide part 120 slides up and down, the piezoelectric body 130 having one end or both ends connected with the slide part 120 vibrates up and down.

The piezoelectric body 130 may further include a first connection part 140 to connect the upper surface of the piezoelectric body 130 and the upper surface of the battery mounting part 111 or at least some of the inner parts of the portable terminal. The first connection part 140 may be formed when necessary. For example, the first connection part 140 should be formed when the opposite ends of the piezoelectric body 130 are connected with the slide part 120 as shown in FIGS. 1 and 2. However, when one end of the piezoelectric body 130 is connected with the slide part 120 and the other end is fixed to the side portion of the battery mounting part 111, the first connection part 140 does not need to be formed. This is because the first connection part 140 may hinder the vibration of the piezoelectric body 130 in that case.

The first connection part 140 may transmit to the piezoelectric body 130 the total weight of the portable terminal or weight of at least some of the inner parts of the portable terminal which can act as external force. The first connection part 140 may be formed in a rod shape as shown in FIGS. 1 and 2, but is not limited thereto. That is, the first connection part 140 may be formed in any shape that can transmit external force to the piezoelectric body 130 and is not limited to a specific shape.

When the first connection part 130 connects the upper surface of the piezoelectric body 130 and the upper surface of the battery mounting part 111 and the piezoelectric body 130 vibrates by sliding movement of the slide part 120, the total weight of the portable terminal may act as external force to the piezoelectric body 130. In this case, the first connection part 140 transmits the external force to the piezoelectric body 130, thereby vibrating the piezoelectric body 130.

When the first connection part 140 connects the upper surface of the piezoelectric body 130 and at least some of the inner parts of the portable terminal and the piezoelectric body 130 vibrates, the weight of the inner parts of the portable terminal may act as external force to the piezoelectric body 130. In this case, the first connection part 140 may transmit the external force to the piezoelectric body 130.

The piezoelectric generator 100 may further include an electrode 160 formed on at least one surface of the piezoelectric body 130. The electrode 160 may be connected with a separate lead wire (not shown) to transmit electricity generated by the vibration of the piezoelectric body 130 to a power supply (not shown) of the portable terminal. For example, the generated electricity is changed through a rectifying device (not shown) to allow electric current to flow in the same direction, is smoothed through a capacitor (not shown) to be used as direct current power, and is converted into a constant voltage through a constant voltage circuit (not shown) to be supplied.

(2) Second Exemplary Embodiment

Hereinafter, a second exemplary embodiment of the present disclosure will be explained. A difference from the first exemplary embodiment will be mainly described and a redundant explanation will be omitted.

Figure 3:
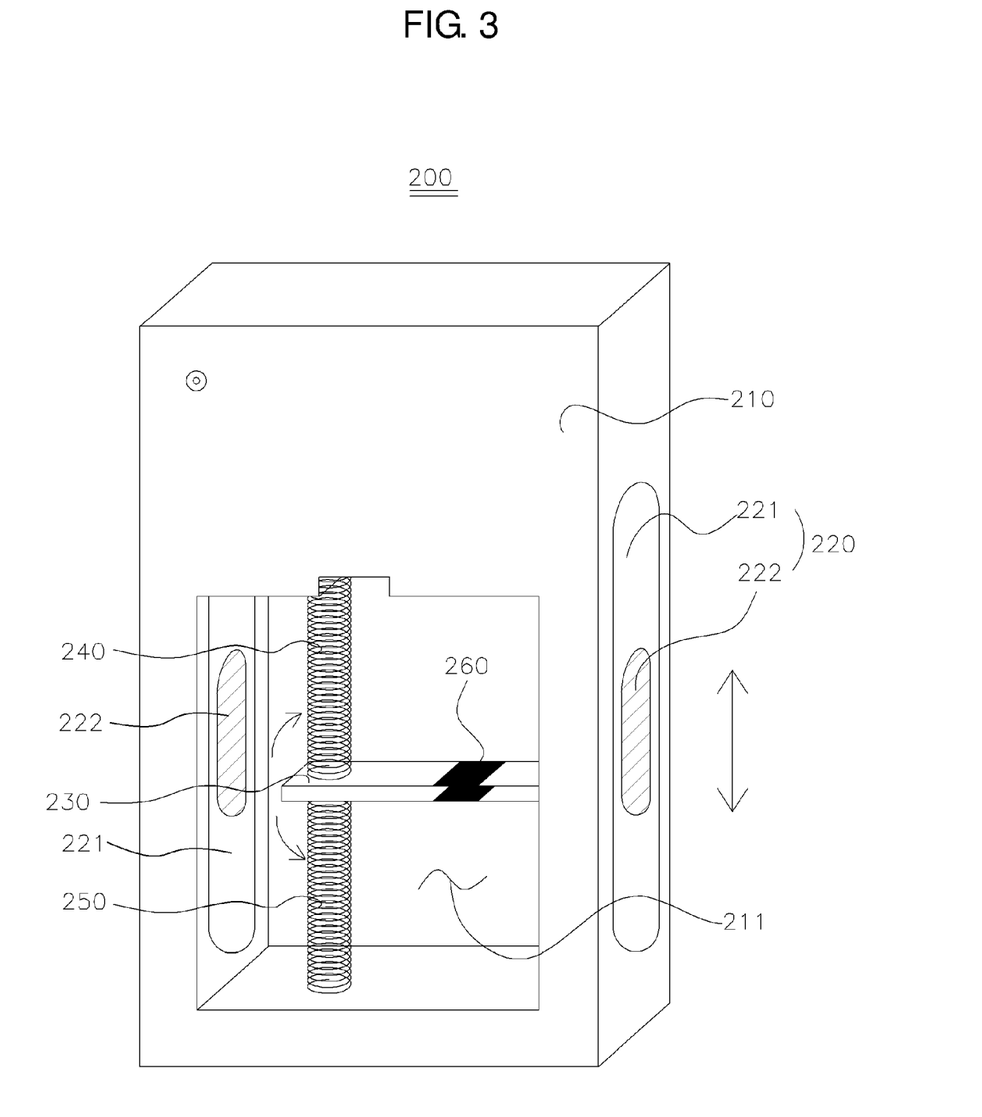
FIG. 3 is a view schematically showing a piezoelectric generator for power supply of a portable terminal according to a second exemplary embodiment of the present disclosure.

FIG. 3 is a view schematically showing a piezoelectric generator 200 for power supply of a portable terminal (hereinafter, referred to as a piezoelectric generator) according to the second exemplary embodiment of the present disclosure.

Referring to FIG. 3, the piezoelectric generator 200 includes a portable terminal case 210, a slide part 220, and a piezoelectric body 230. The portable terminal case 210 and the slide part 220 are the same as those described in the first exemplary embodiment and thus redundant explanation will be omitted.

The piezoelectric body 230 is connected with the slide part 220 and is disposed in a battery mounting part 211 in a transverse direction. The piezoelectric body 230 is different from that of the first exemplary embodiment in that one end of the piezoelectric body 230 is connected with the slide part 220 and fixed, but the other end is not connected with the slide part 220 when the piezoelectric body 230 is mounted in the battery mounting part 211. Regarding this, FIG. 3 illustrates the piezoelectric body 230 having the right end connected with the slide part 220 and fixed and the left end not being connected with the slide part 220.

Accordingly, when the slide part 220 slides up and down, the other end of the piezoelectric body 230 having one end connected with the slide part 220 may bend up and down and vibrates due to the total weight of the portable terminal or weight of at least some of the inner parts of the portable terminal acting as external force.

The piezoelectric generator 200 may further include a first connection part 240. The first connection part 240 connects the upper surface of the piezoelectric body 230 and the upper surface of the battery mounting part 211 or at least some of the inner parts of the portable terminal.

The first connection part 240 may receive the external force caused by the total weight of the portable terminal or weight of at least some of the inner parts of the portable terminal, and transmit elastic force to the piezoelectric body 230.

For example, when the first connection part 240 connects the upper surface of the piezoelectric body 230 and the upper surface of the battery mounting part 211, and the piezoelectric body 230 vibrates by movement of the slide part 220, the total weight of the portable terminal may act as external force. In this case, the first connection part 240 may transmit elastic force caused by the external force to the piezoelectric body 230.

When the first connection part 240 connects the upper surface of the piezoelectric body 230 and at least some of the inner parts of the portable terminal, and the piezoelectric body 230 vibrates, the weight of the inner parts of the portable terminal may act as external force to the piezoelectric body 230. In this case, the first connection part 240 may transmit elastic force caused by the external force to the piezoelectric body 230.

The piezoelectric generator 200 may further include a second connection part 250. The second connection part 250 connects the lower surface of the piezoelectric body 230 and the bottom surface of the battery mounting part 211.

The second connection part 250 facilitates vibration of the piezoelectric body 230. For example, when the first connection part 240 and the second connection part 250 are connected with the upper and lower surfaces of the piezoelectric body 230, respectively, and the other end of the piezoelectric body 230 moves down, the second connection part 250 is compressed and the first connection part 240 is stretched. Thereafter, when the piezoelectric body 230 moves up again (vibration), the piezoelectric body 230 receives the elastic force of the second connection part 250 and thus the vibration effect is enhanced (for example, an amplitude increases and a vibrating time increases).

The first connection part 240 and the second connection part 250 may be formed of a member having elasticity such as an elastic wire or a coil spring, and may be formed of the same material or different materials. Regarding this, the first connection part 240 and the second connection part 250 are coil springs in FIG. 3.

Figure 4:
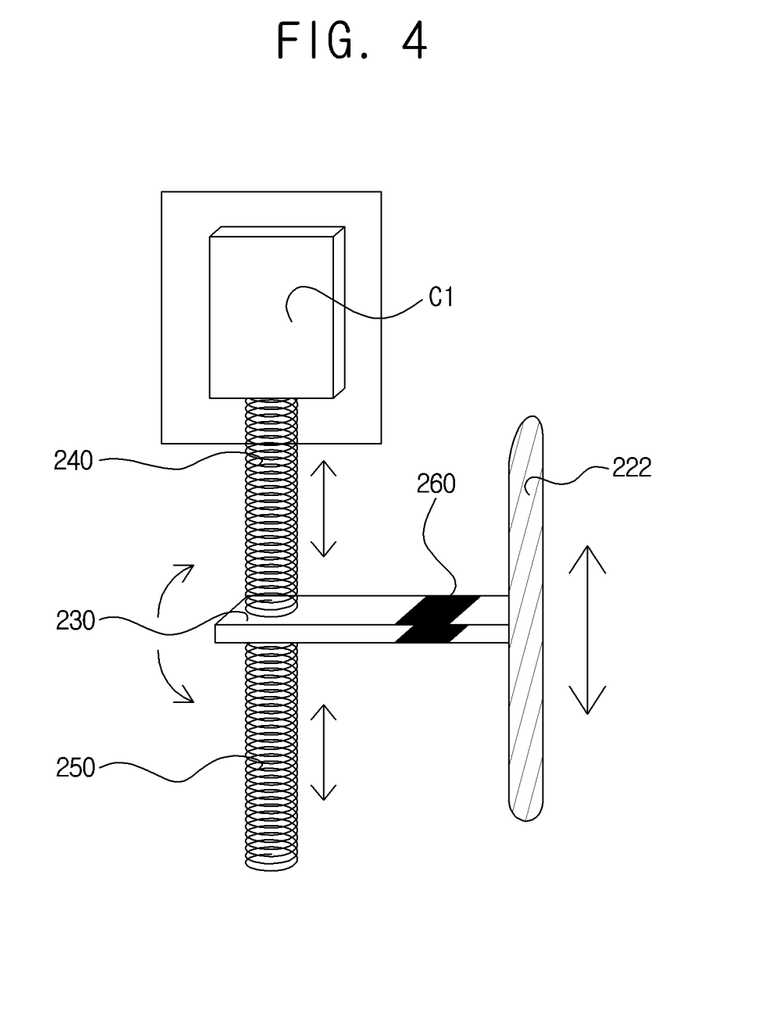
FIG. 4 is a view schematically showing an operation of the piezoelectric generator of FIG. 3.

FIG. 4 is a view schematically showing an operation of the piezoelectric generator 200 of FIG. 3. In FIG. 4, the portable terminal case 210 of FIG. 3 is not illustrated for convenience of explanation.

Referring to FIG. 4, the piezoelectric body 230 is connected with the slide bar 222 in a perpendicular direction to the slide bar 222, and has the upper surface connected with one end of the first connection part 240 and the lower surface connected with one end of the second connection part 250. The other end of the first connection part 240 is connected with an inner part C1 of the portable terminal and the other end of the second connection part 250 may be fixed to the bottom surface of the portable terminal.

When the user moves the slide bar 222 up and down several times to supply power to the portable terminal, the end of the piezoelectric body 130 that is not connected with the slide bar 222 vibrates up and down. In this case, the piezoelectric body 230 is subjected to external force corresponding to the weight of the inner part C1 of the portable terminal and receive elastic force from the first connection part 240 and the second connection part 250, so that the vibration effect is enhanced and thus electricity of a predetermined level is generated. The generated electricity is transmitted to a power supply (not shown) through an electrode 260 and a lead wire (not shown) formed on the piezoelectric body 230.

Although not shown in FIG. 4, the first connection part 240 may be connected with the portable terminal case 210 rather than the inner part C1 of the portable terminal. In this case, the external force applied to the piezoelectric body 230 is not the weight of the inner part C1 of the portable terminal but the weight of the portable terminal.

As described above, the piezoelectric generator 200 vibrates the piezoelectric body 230 which is connected with the slide part 220 and is disposed in the battery mounting part 211 by allowing the slide part 220 to move up and down, so that the portable terminal can be regularly charged.

(3) Third Exemplary Embodiment

Hereinafter, a third exemplary embodiment of the present disclosure will be explained. A difference from the first or second exemplary embodiment will be mainly described and redundant explanation will be omitted.

Figure 5:
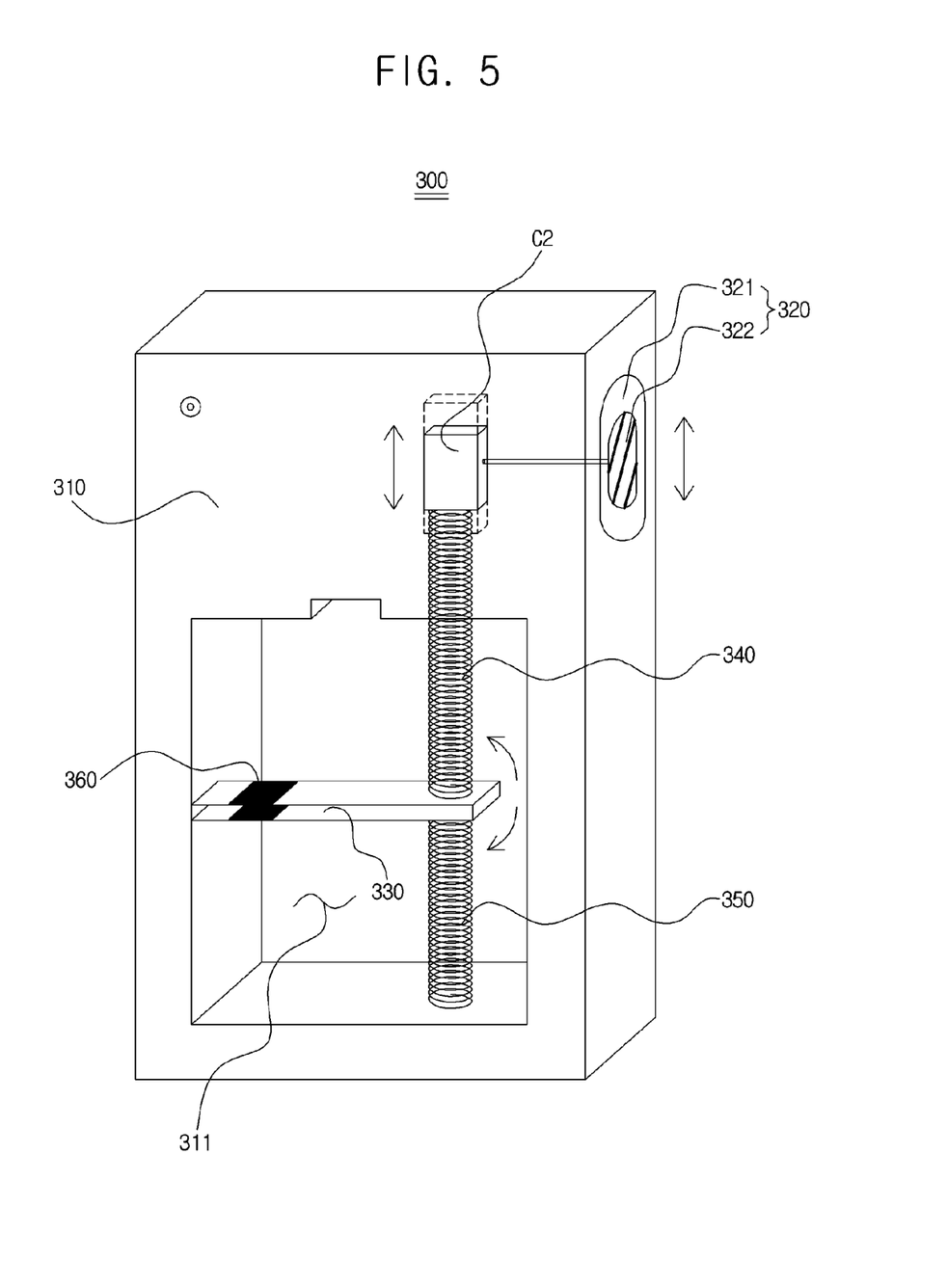
FIG. 5 is a view schematically showing a piezoelectric generator for power supply of a portable terminal according to a third exemplary embodiment of the present disclosure.

FIG. 5 is a view schematically showing a piezoelectric generator 300 for power supply of a portable terminal (hereinafter, referred to as a piezoelectric generator) according to the third exemplary embodiment of the present disclosure.

Referring to FIG. 5, the piezoelectric generator 300 includes: a portable terminal case 310 which has a battery mounting part 311 formed on one surface thereof and has parts of the portable terminal mounted therein; a slide part 320 which is formed on at least one side surface of the portable terminal case 310 to be able to slide up and down and is connected with at least some of the parts of the portable terminal; and a piezoelectric body 330 which has one end or opposite ends fixed to the battery mounting part 311 and is disposed in a transverse direction.

The piezoelectric generator 300 may further include a first connection part 340 which connects the piezoelectric body 330 and the upper surface of the battery mounting part 311 or at least some of the inner parts C2 of the portable terminal, and a second connection part 350 which connects the piezoelectric body 330 and the bottom surface of the battery mounting part 311. Regarding this, FIG. 5 illustrates the piezoelectric body 330 having one end fixed to the battery mounting part 311 and the other end connected with the first connection part 340 and the second connection part 350.

The piezoelectric generator 300 of the third exemplary embodiment is different from those of the first and second exemplary embodiments in that the slide part 320 is connected with at least some of the parts of the portable terminal rather than being connected with the piezoelectric body 330. At least some of the parts of the portable terminal is referred to as "inner part C2" for convenience of explanation.

The slide part 320 is formed on at least one side surface of the border of the portable terminal case 310. Regarding this, FIG. 5 illustrates the slide part 320 formed on the upper right surface of the border of the portable terminal case 310. However, this should not be considered as limiting.

For example, the slide part 320 may have a slide recess 321 of a predetermined size formed on the border of the portable terminal case 310 and have the longitudinal slide bar 322 inserted into the slide recess 321 to be able to slide up and down along the slide recess 321. According to an exemplary embodiment, the slide part 320 may include only the slide bar 322 which is able to slide up and down without the slide recess 321.

Since the slide part 320 is connected with the inner part C2 unlike in the first and second exemplary embodiments, the slide part 320 may be disposed on the upper side surface of the border of the portable terminal case 310 and the slide bar 322 has a size corresponding to a small size of the inner part C2.

The shape and size of the slide recess 321 and the slide bar 322 are not limited and any shape and any size can be applied if the slide bar 322 can slidably be formed on one side surface of the border of the portable terminal case 310.

The piezoelectric body 330 may have at least one end fixed to the battery mounting part 311 and may be disposed in the transverse direction. That is, the opposite ends of the piezoelectric body 330 may be fixed or only one end of the piezoelectric body 330 may be fixed. However, FIG. 5 illustrates the piezoelectric body 330 having the left end fixed to the battery mounting part 311 and the other end disposed to be able to vibrate.

The other elements except for the above-described slide part 320 are the same as or similar to those in the first and second exemplary embodiments. In the present exemplary embodiment, when the user moves the slide bar 322 up and down several times to supply emergency power to the portable terminal, the inner part C2 connected with the slide bar 322 vibrates up and down.

External force caused by the vibration of the inner part C2 is applied to the piezoelectric body 330 through the first connection part 340, thereby vibrating the piezoelectric body 330. Accordingly, electricity of a predetermined level is generated. The generated electricity may be transmitted to a power supply (not shown) through an electrode 360 or a lead wire (not shown) formed on the piezoelectric body 330. The second connection part 350 facilitates the vibration of the piezoelectric body 330 like in the second exemplary embodiment.

(4) Accessory Connection Part

An accessory connection part may be formed on at least part of the slide part described in the above-described exemplary embodiments (first, second, and third exemplary embodiments).

Figure 6:
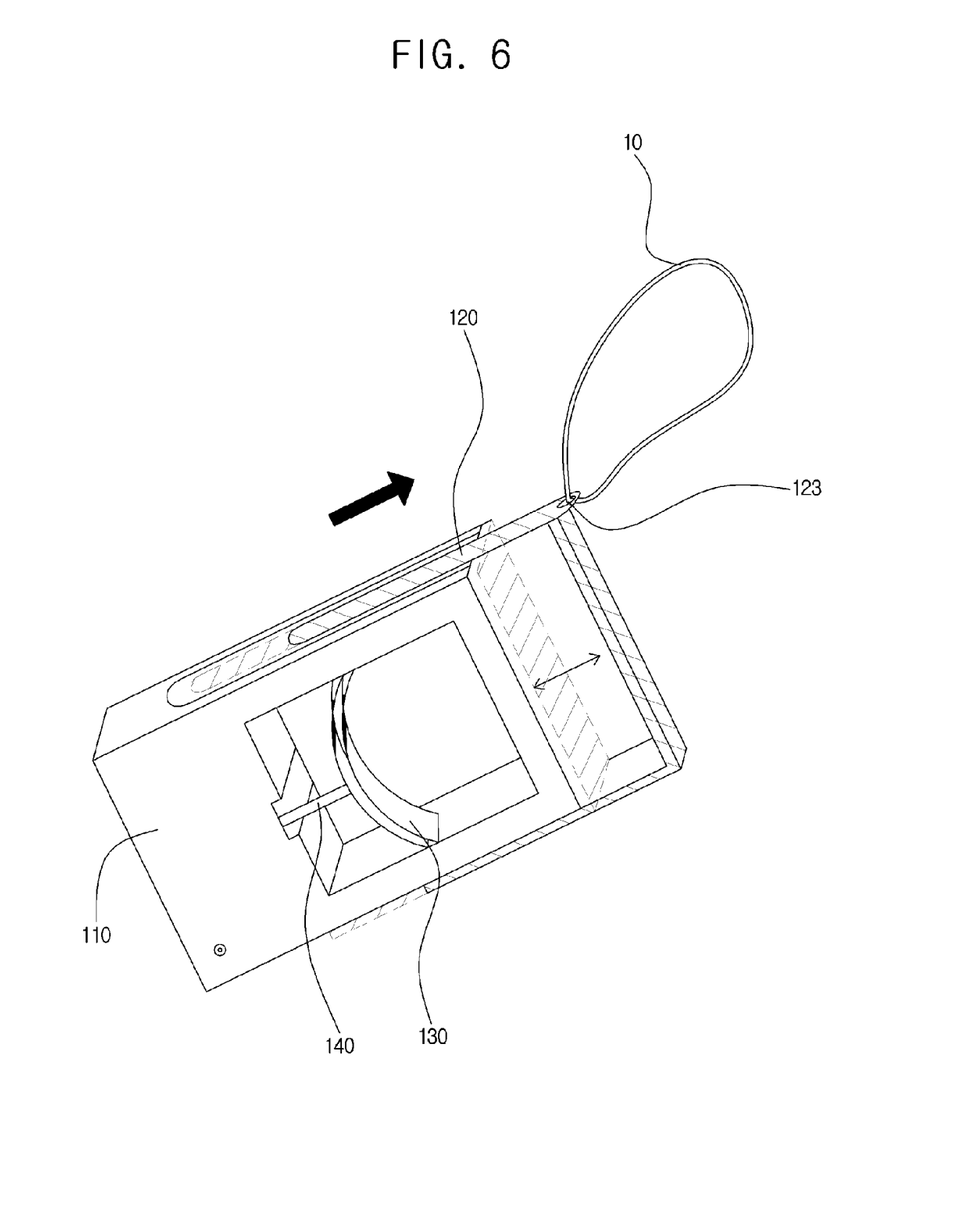
FIG. 6 is a view additionally showing an accessory connection part in the piezoelectric generator of FIG. 2.

FIG. 6 is a view additionally showing an accessory connection part 123 in the piezoelectric generator shown in FIG. 2.

Referring to FIG. 6, the accessory connection part 123 may be formed on at least part of the slide part 120. The accessory connection part 123 is a part with which the user connects an accessory 10. The accessory 10 may refer to any kind of accessory 10 typically attached to the portable terminal, such as a strap, a key ring, a portable terminal cleaner, a mobile transportation card, and the like. In FIG. 6, the accessory 10 is a strap.

The accessory connection part 123 may be formed in various shapes such as a ring shape, a clip shape, and the like to allow the accessory 10 to be connected therewith, but is not limited to a specific shape.

When the accessory connection part 123 is formed on at least part of the slide part 120, the user can carry the accessory 10 such as a strap and a key ring by connecting the accessory 10 with the accessory connection part 120. In this case, the user may touch the accessory 10 in daily life and thus the slide part 120 naturally moves, thereby vibrating the piezoelectric body 130 connected with the slide part 120.

For example, when the user connects a strap with the accessory connection part 123 and hangs the other end of the strap on a belt or a specific part of a bag, the strap moves by user's motion and thus the slide part 120 moves by the movement of the strap, thereby vibrating the piezoelectric body 130.

Accordingly, even when the user does not intentionally moves the slide part 120, power can be regularly generated by user's motion in daily life.

According to the above-described exemplary embodiments, the slide part is formed on the portable terminal case and the piezoelectric body or at least part of the parts of the portable terminal vibrates by the movement of the slide part. Therefore, power can be supplied to the portable terminal with a relatively simple configuration and can be usefully used in an emergency case.

In addition, the weight of the portable terminal or at least some of the parts of the portable terminal may be used to vibrate the piezoelectric body, so that power can be generated without increasing the weight and volume of the portable terminal.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A piezoelectric generator for power supply of a portable terminal, comprising:
    a portable terminal case which has a battery mounting part formed on one surface thereof and has parts of the portable terminal mounted therein, wherein the portable terminal case has a first lateral surface and a second lateral surface opposite to the first lateral surface;
    a first slide part on the first lateral surface, wherein the first slide part is configured to slide along the first lateral surface of the portable terminal case;
    a second slide part on the second lateral surface, wherein the second slide part is configured to slide along the second lateral surface of the portable terminal case;
    a piezoelectric body having a first end and a second end disposed in the battery mounting part in a transverse direction; and
    a first connection part connecting the piezoelectric body to an upper surface of the battery mounting part or to an inner part of the portable terminal, wherein the first connection part is configured to transmit a weight of the portable terminal or the inner part of the portable terminal to the piezoelectric body,
    wherein the first end of the piezoelectric body is attached to the first slide part or the second end of the piezoelectric body is attached to the second slide part.

2. The piezoelectric generator of claim 1, further comprising a second connection part which connects the piezoelectric body and a bottom surface of the battery mounting part.

3. The piezoelectric generator of claim 2, wherein the first connection part and the second connection part are elastic plates, elastic wires, or coil springs.

4. The piezoelectric generator of claim 1, further comprising an electrode which is formed on at least one surface of the piezoelectric body.

5. The piezoelectric generator of claim 1, wherein the first slide part protrudes from the first lateral surface of the portable terminal case by a first predetermined distance.

6. The piezoelectric generator of claim 5, wherein the second slide part protrudes from the second lateral surface of the portable terminal case by a second predetermined distance.

7. A piezoelectric generator for power supply of a portable terminal, comprising:
    a portable terminal case which has a battery mounting part formed on one surface thereof and has parts of the portable terminal mounted therein, wherein the portable terminal case has a first lateral surface and a second lateral surface opposite to the first lateral surface;
    a slide part having a first slide bar configured to slide along the first lateral surface of the portable terminal case and a second slide bar configured to slide along the second lateral surface of the portable terminal case;
    a piezoelectric body having a first end and a second end disposed in the battery mounting part in a transverse direction, and a first connection part connecting the piezoelectric body to an upper surface of the battery mounting part or to an inner part of the portable terminal, wherein the first connection part is configured to transmit a weight of the portable terminal or the inner part of the portable terminal to the piezoelectric body, wherein the first end of the piezoelectric body is attached to the first slide bar of the slide part or the second end of the piezoelectric body is attached to the second slide bar of the slide part.

8. The piezoelectric generator of claim 7, wherein the slide part has an accessory connection part configured to connect to an accessory.

9. The piezoelectric generator of claim 7, wherein the first slide bar protrudes from the first lateral surface of the portable terminal case by a first predetermined distance.

10. The piezoelectric generator of claim 9, wherein the second slide bar protrudes from the second lateral surface of the portable terminal case by a second predetermined distance.

11. The piezoelectric generator of claim 8, wherein the accessory is at least one selected from the group consisting of a strap or a key ring.

12. The piezoelectric generator of claim 7, further comprising a second connection part which connects the piezoelectric body and a bottom surface of the battery mounting part.

13. The piezoelectric generator of claim 12, wherein the first connection part and the second connection part are elastic plates, elastic wires, or coil springs.

* * * * *